(12) United States Patent
Zou

(10) Patent No.: US 12,298,618 B2
(45) Date of Patent: May 13, 2025

(54) DISPLAY MODULE, MANUFACTURING METHOD THEREOF, AND DISPLAY DEVICE

(71) Applicant: TCL CHINA STAR OPTOELECTRONICS TECHNOLOGY CO., LTD., Shenzhen (CN)

(72) Inventor: Guangnan Zou, Shenzhen (CN)

(73) Assignee: TCL CHINA STAR OPTOELECTRONICS TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 17/431,141

(22) PCT Filed: Jun. 18, 2021

(86) PCT No.: PCT/CN2021/100772
§ 371 (c)(1),
(2) Date: Dec. 15, 2022

(87) PCT Pub. No.: WO2022/257168
PCT Pub. Date: Dec. 15, 2022

(65) Prior Publication Data
US 2023/0408859 A1    Dec. 21, 2023

(30) Foreign Application Priority Data
Jun. 8, 2021 (CN) .......................... 202110637784.9

(51) Int. Cl.
*G02F 1/1335* (2006.01)
(52) U.S. Cl.
CPC .. *G02F 1/133528* (2013.01); *G02F 1/133512* (2013.01)

(58) Field of Classification Search
CPC ..................... G02F 1/133512; G02F 1/133528
See application file for complete search history.

(56) References Cited

U.S. PATENT DOCUMENTS

2003/0095219 A1    5/2003  Lee
2016/0363795 A1   12/2016  Jeon

FOREIGN PATENT DOCUMENTS

| CN | 105242451 A | 1/2016 |
|----|-------------|--------|
| CN | 106444121 A | 2/2017 |
| CN | 106547140 A | 3/2017 |
| CN | 108153071 A | 6/2018 |

(Continued)

OTHER PUBLICATIONS

International Search Report in International application No. PCT/CN2021/100772, mailed on Feb. 25, 2022.

(Continued)

*Primary Examiner* — Joseph L Williams
(74) *Attorney, Agent, or Firm* — PV IP PC; Wei Te Chung

(57) ABSTRACT

The present application discloses a display module, a manufacturing method thereof, and a display device. The display module includes a display panel and a polarizer, and the display panel includes a first substrate, a second substrate, and a liquid crystal layer; wherein the first substrate includes a bonding section located in a stepped sub-area of the display module, a black shielding layer is provided on one side of the extension section of the polarizer, and an orthographic projection of the black shielding layer on the first substrate at least covers the bonding section.

18 Claims, 4 Drawing Sheets

(56) References Cited

FOREIGN PATENT DOCUMENTS

| | | | |
|---|---|---|---|
| CN | 108196386 | A | 6/2018 |
| CN | 207764515 | U | 8/2018 |
| CN | 108803125 | A | 11/2018 |
| CN | 109491132 | A | 3/2019 |
| CN | 110109287 | A | 8/2019 |
| CN | 110824750 | A | 2/2020 |
| CN | 111766729 | A | 10/2020 |
| JP | 2020148793 | A | 9/2020 |

OTHER PUBLICATIONS

Written Opinion of the International Searching Authority in International application No. PCT/CN2021/100772, mailed on Feb. 25, 2022.

Chinese Office Action in corresponding Chinese Patent Application No. 202110637784.9 dated Jan. 17, 2022, pp. 1-10.

```
┌─────────────────────────────────────────────────────────────┐
│   providing a display panel, wherein the display panel comprises a first substrate │
│ and a second substrate disposed opposite to each other, and a liquid crystal layer │
│ disposed between the first substrate and the second substrate, the display module │
│ comprises a display area and a non-display area adjacent to the display area, the non- │─S10
│ display area comprises a stepped sub-area located at one side of the display area, and │
│ the first substrate comprises a bonding section located in the stepped sub-area;  │
└─────────────────────────────────────────────────────────────┘
                                  │
                                  ▼
┌─────────────────────────────────────────────────────────────┐
│   providing a polarizer, wherein the polarizer comprises an extension section, and │─S20
│ forming a black shielding layer on one side of the extension section;             │
└─────────────────────────────────────────────────────────────┘
                                  │
                                  ▼
┌─────────────────────────────────────────────────────────────┐
│   adhering the polarizer to a light-exiting side of the display panel, wherein the │
│ polarizer is disposed on a side of the second substrate away from the first substrate, │─S30
│ and an orthographic projection of the black shielding layer on the first substrate │
│ covers at least the bonding section.                                              │
└─────────────────────────────────────────────────────────────┘
```

FIG. 7

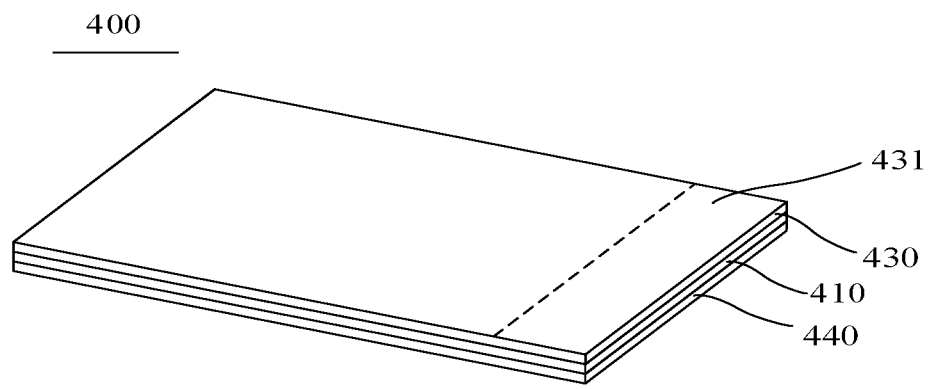

FIG. 8

DISPLAY MODULE, MANUFACTURING METHOD THEREOF, AND DISPLAY DEVICE

RELATED APPLICATIONS

This application is a Notional Phase of PCT Patent Application No. PCT/CN2021/100772 having international filing date of Jun. 18, 2021, which claims the benefit of priority of Chinese Patent Application No. 202110637784.9 filed on Jun. 8, 2021. The contents of the above applications are all incorporated by reference as if fully set forth herein in their entirety.

BACKGROUND OF INVENTION

Field of Invention

The present application relates to the field of display, in particular to a display module, a manufacturing method thereof, and a display device.

Description of Prior Art

At present, popularity of full-screen mobile phones is getting higher and higher, and screens with high screen-to-body ratios are becoming more and more popular. Therefore, regardless of TV, mobile phone, or display screen, manufacturers' requirements for bezels are gradually increasing. A display device has gone from an original four-sided bezel cover, to a three-sided bezel-less afterwards, to a four-sided bezel-less that has appeared in recent years, which not only increases aesthetics of display, but also enhances broadness of user's visual experience.

In an existing design, on a side where a bonding area (chip on film, COF) of a display panel is located, an array substrate of the display panel extends beyond a color filter substrate to form a stepped sub-area, and the array substrate includes a bonding section located in the stepped sub-area. Due to existence of the bonding area and the stepped sub-area, a bezel needs to be provided at the side where the bonding area is located. The bezel includes a sub-bezel covering the stepped sub-area. Therefore, due to the existence of the bezel, the bezel-less design cannot be realized on the side of the display panel where the bonding area is located.

SUMMARY OF INVENTION

Embodiments of the present application provide a display module, a manufacturing method thereof, and a display device, which are used to implement a four-sided bezel-less design of a display device.

In order to realize the above-mentioned functions, technical solutions provided by the embodiments of the present application are as follows:

A display device includes a display panel and a polarizer arranged on a light-exiting side of the display panel, the display panel includes a first substrate and a second substrate arranged opposite to each other, and a liquid crystal layer disposed between the first substrate and the second substrate, and the polarizer is disposed on a side of the second substrate away from the first substrate;

wherein the display module further includes a display area and a non-display area adjacent to the display area, and the non-display area includes a stepped sub-area located at one side of the display area; and wherein the first substrate includes a bonding section located in the stepped sub-area, the polarizer includes an extension section extending into the stepped sub-area, a black shielding layer is disposed on one side of the extension section, and an orthographic projection of the black shielding layer on the first substrate at least covers the bonding section.

In the display module provided in an embodiment of the present application, the black shielding layer is located on a side of the extension section of the polarizer close to the first substrate.

In the display module provided in an embodiment of the present application, the display module further includes a filling layer located between the black shielding layer and the bonding section; and wherein the orthographic projection of the black shielding layer in a direction perpendicular to a plane where the display panel is located at least covers an orthographic projection of the filling layer in the direction perpendicular to the plane where the display panel is located.

In the display module provided in an embodiment of the present application, a side of the filling layer close to the second substrate is flush with a side of the black shielding layer close to the second substrate, and a side of the filling layer away from the second substrate is flush with a side of the black shielding layer away from the second substrate.

In the display module provided in an embodiment of the present application, the display module further includes a black matrix disposed between the first substrate and the second substrate, and the black matrix is located in the non-display area, and the black matrix includes a black shielding wall close to the stepped sub-area; and wherein the orthographic projection of the black shielding layer on the first substrate is adjacent to an orthographic projection of the black shielding wall on the first substrate, and a distance between the orthographic projection of the black shielding layer on the first substrate and the orthographic projection of the black shielding wall on the first substrate is equal to zero.

In the display module provided in an embodiment of the present application, the black shielding layer includes a black shielding sub-layer extending to the display area and located above the black shielding wall, and an orthographic projection of the black shielding wall on the second substrate covers an orthographic projection of the black shielding sub-layer on the second substrate.

In the display module provided in an embodiment of the present application, the display module further includes a chip-on-film bound on the bonding section; and wherein the orthographic projection of the black shielding layer in a direction perpendicular to a plane where the display panel is located covers orthographic projections of the chip-on-film and the bonding section in the direction perpendicular to the plane where the display panel is located.

In the display module provided in an embodiment of the present application, the display module further includes a driving circuit disposed on the chip-on-film, and the orthographic projection of the black shielding layer in the direction perpendicular to the plane where the display panel is located covers an orthographic projection of the driving circuit in the direction perpendicular to the plane where the display panel is located.

In the display module provided in an embodiment of the present application, the black shielding layer is located on a side of the extension section away from the first substrate.

An embodiment of the present application also provides a method of manufacturing a display module, comprising following steps: providing a display panel, wherein the display panel includes a first substrate and a second substrate disposed opposite to each other, and a liquid crystal layer disposed between the first substrate and the second substrate, the display module includes a display area and a non-display area adjacent to the display area, the non-display area includes a stepped sub-area located at one side of the display area, and the first substrate includes a bonding section located in the stepped sub-area;

providing a polarizer, wherein the polarizer includes an extension section, and forming a black shielding layer on one side of the extension section; and adhering the polarizer to a light-exiting side of the display panel, wherein the polarizer is disposed on a side of the second substrate away from the first substrate, and an orthographic projection of the black shielding layer on the first substrate covers at least the bonding section.

In the method of manufacturing the display module provided in an embodiment of the present application, the step of providing the polarizer, wherein the polarizer including the extension section, and forming the black shielding layer on the side of the extension section includes:

providing a polarizing film, wherein the polarizing film includes the polarizer and a release film formed on the polarizer, and the polarizer includes the extension section;

cutting the release film to form a release sub-film corresponding to the extension section; and removing the release sub-film, and forming the black shielding layer on the extension section.

An embodiment of the present application also provides a display device, including a display module, wherein the display module includes a display panel and a polarizer arranged on a light-exiting side of the display panel, the display panel includes a first substrate and a second substrate arranged opposite to each other, and a liquid crystal layer disposed between the first substrate and the second substrate, and the polarizer is disposed on a side of the second substrate away from the first substrate;

wherein the display module further includes a display area and a non-display area adjacent to the display area, and the non-display area includes a stepped sub-area located at one side of the display area; and wherein the first substrate includes a bonding section located in the stepped sub-area, the polarizer includes an extension section extending into the stepped sub-area, a black shielding layer is disposed on one side of the extension section, and an orthographic projection of the black shielding layer on the first substrate at least covers the bonding section.

In the display device provided by an embodiment of the present application, the black shielding layer is located on a side of the extension section of the polarizer close to the first substrate.

In the display device provided by an embodiment of the present application, the display module further includes a filling layer located between the black shielding layer and the bonding section; and wherein the orthographic projection of the black shielding layer in a direction perpendicular to a plane where the display panel is located at least covers an orthographic projection of the filling layer in the direction perpendicular to the plane where the display panel is located.

In the display device provided by an embodiment of the present application, a side of the filling layer close to the second substrate is flush with a side of the black shielding layer close to the second substrate, and a side of the filling layer away from the second substrate is flush with a side of the black shielding layer away from the second substrate.

In the display device provided by an embodiment of the present application, the display module further includes a black matrix disposed between the first substrate and the second substrate, and the black matrix is located in the non-display area, and the black matrix includes a black shielding wall close to the stepped sub-area; and wherein the orthographic projection of the black shielding layer on the first substrate is adjacent to an orthographic projection of the black shielding wall on the first substrate, and a distance between the orthographic projection of the black shielding layer on the first substrate and the orthographic projection of the black shielding wall on the first substrate is equal to zero.

In the display device provided by an embodiment of the present application, the black shielding layer includes a black shielding sub-layer extending to the display area and located above the black shielding wall, and an orthographic projection of the black shielding wall on the second substrate covers an orthographic projection of the black shielding sub-layer on the second substrate.

In the display device provided by an embodiment of the present application, the display module further includes a chip-on-film bound on the bonding section; and wherein the orthographic projection of the black shielding layer in a direction perpendicular to a plane where the display panel is located covers orthographic projections of the chip-on-film and the bonding section in the direction perpendicular to the plane where the display panel is located.

In the display device provided by an embodiment of the present application, the display module further includes a driving circuit disposed on the chip-on-film, and the orthographic projection of the black shielding layer in the direction perpendicular to the plane where the display panel is located covers an orthographic projection of the driving circuit in the direction perpendicular to the plane where the display panel is located.

In the display device provided by an embodiment of the present application, the black shielding layer is located on a side of the extension section away from the first substrate.

An embodiment of the present application provides a display module. The display module includes a display panel and a polarizer arranged on a light-exiting side of the display panel, the display panel includes a first substrate and a second substrate arranged opposite to each other, and a liquid crystal layer disposed between the first substrate and the second substrate, and the polarizer is disposed on a side of the second substrate away from the first substrate; wherein the display module further includes a display area and a non-display area adjacent to the display area, and the non-display area includes a stepped sub-area located at one side of the display area; and wherein the first substrate includes a bonding section located in the stepped sub-area, the polarizer includes an extension section extending into the stepped sub-area, a black shielding layer is disposed on one side of the extension section, and an orthographic projection of the black shielding layer on the first substrate at least covers the bonding section. As such, there is no need to worry that the bonding section will be exposed and impact visual experience, and a bezel for protecting the bonding section is omitted to truly realize bezel-lessness.

BRIEF DESCRIPTION OF DRAWINGS

The technical solutions and beneficial effects of the present application will be made obvious by describing specific implementations of the present application in detail below in conjunction with the accompanying drawings.

FIG. 7 is a flow chart showing a method of manufacturing the display module provided by an embodiment of the present application.

FIG. 8 is a schematic structural diagram of a display film provided by an embodiment of the present application.

DETAILED DESCRIPTION OF PREFERRED EMBODIMENTS

The present application provides a display module, a manufacturing method thereof, and a display device. In order to make the purpose, technical solution, and effect of the present application clearer and more definite, the present application is further described in detail below with reference to the accompanying drawings and examples. It should be understood that the specific embodiments described herein are only used to explain the present application, and are not used to limit the present application.

Figure 1:
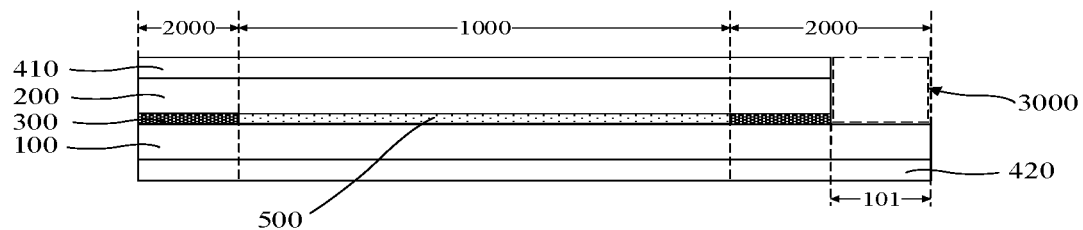
FIG. 1 is a schematic structural diagram of a display module in the prior art.
Figure 2:
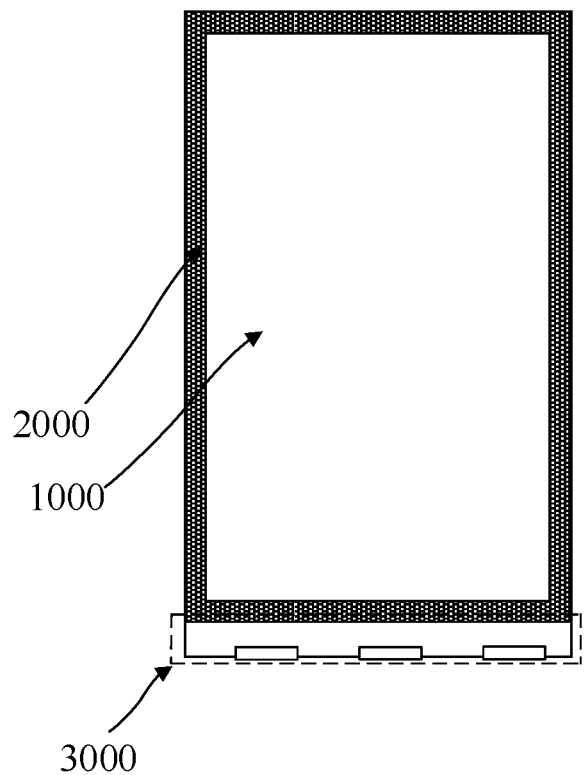
FIG. 2 is a top view of a display module in the prior art.

Referring to FIG. 1 and FIG. 2 in conjunction, FIG. 1 is a schematic structural diagram of a display module in the prior art, and FIG. 2 is a top view of a display module in the prior art.

In the prior art, the display module includes a display panel, a first polarizer 410, and a second polarizer 420; wherein the display panel includes a first substrate 100 and a second substrate 200 disposed opposite to each other, and a liquid crystal layer 500 and a black matrix 300 disposed between the first substrate 100 and the second substrate 200, the first polarizer 410 is disposed on a side of the second substrate 200 away from the first substrate 100, and the second polarizer 420 is disposed on a side of the first substrate 100 away from the second substrate 200. The display module includes a display area 1000 and a non-display area 2000 adjacent to the display area 1000. The non-display area 2000 includes a stepped sub-area 3000 located at one side of the display area 1000; wherein, the first substrate 100 includes a bonding section 101 located in the stepped sub-area 3000. It is appreciated that due to existence of the bonding section 101 and the stepped sub-area 3000, the side of the display panel where the stepped sub-area 3000 is located is not flat. Therefore, a bezel needs to be provided to cover the side where the stepped sub-area 3000 is located, so that the display panel cannot achieve a borderless design on the side where the binding section 101 is located. In view of this, the embodiments of the present application provide a display panel and a display device, which are used to implement a four-sided bezel-less design of the display module.

Referring to FIGS. 3 to 6, an embodiment of the present application provides a display module, including a display panel and a polarizer disposed on a light-exiting side of the display panel, wherein the display panel includes a first substrate 100 and a second substrate 200 disposed opposite to each other, and a liquid crystal layer 500 disposed between the first substrate 100 and the second substrate 200, and the polarizer is disposed on a side of the second substrate 200 away from the first substrate 100.

The display module includes a display area 1000 and a non-display area 2000 adjacent to the display area 1000, and the non-display area 2000 includes a stepped sub-area 3000 located at one side of the display area 1000.

The first substrate 100 includes a bonding section 101 located in the stepped sub-area 3000, the polarizer includes an extension section extending into the stepped sub-area 3000, and one side of the extension section is provided with a black shielding layer 600, and an orthographic projection of the black shielding layer 600 on the first substrate 100 at least covers the bonding section 101.

In an embodiment of the present application, a black shielding layer 600 is provided on one side of the extension section of the polarizer. The orthographic projection of the black shielding layer 600 on the first substrate 100 at least covers the bonding section 101, and thus, there is no need to worry that the bonding section will be exposed and impact visual experience, and a bezel for protecting the bonding section is omitted to truly realize bezel-lessness.

The technical solution of the present application will now be described in conjunction with specific embodiments.

Figure 3:
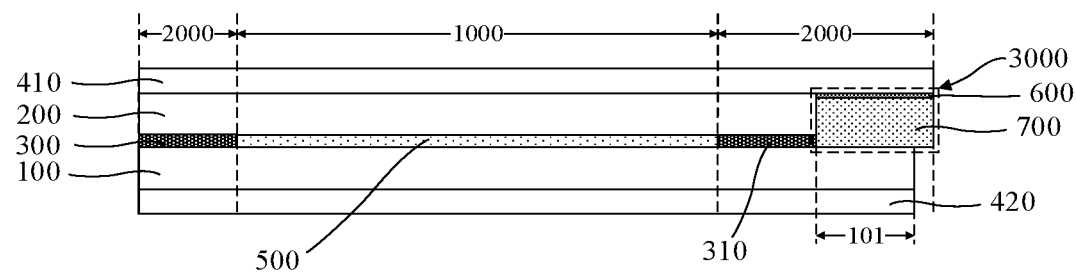
FIG. 3 is a schematic diagram of a first structure of a display module provided by an embodiment of the present application.
Figure 4:
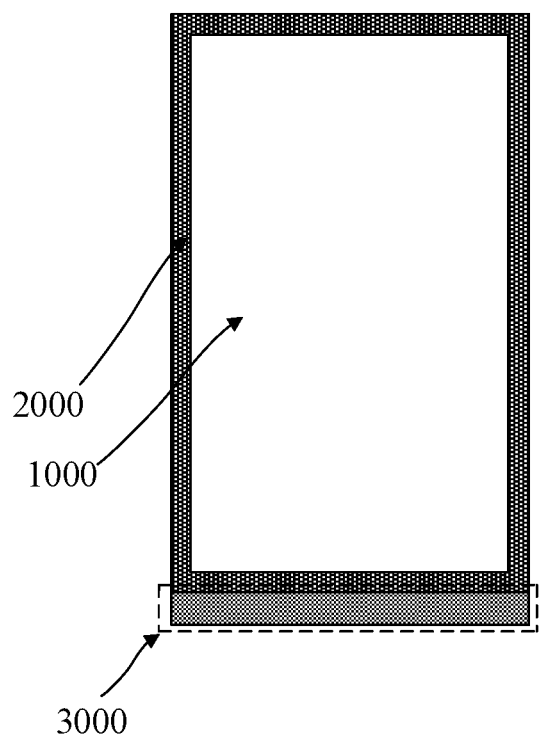
FIG. 4 is a top view of the display module provided by an embodiment of the present application.

Please refer to FIG. 3 and FIG. 4 in conjunction, where FIG. 3 is a schematic diagram of a first structure of a display module provided by an embodiment of the present application, and FIG. 4 is a top view of the display module provided by an embodiment of the present application.

This embodiment provides a display module, which includes a display panel, a first polarizer 410 disposed on the light-exiting side of the display panel, and a second polarizer 420 disposed on the display panel away from the light-exiting side. The display panel includes a first substrate 100 and a second substrate 200 disposed opposite to each other, and a liquid crystal layer 500 disposed between the first substrate 100 and the second substrate 200, and the first polarizer 410 is disposed on a side of the second substrate 200 away from the first substrate 100, and the first polarizer 410 is disposed on a side of the first substrate 100 away from the second substrate 200.

The display module includes a display area 1000 and a non-display area 2000 adjacent to the display area 1000, the non-display area 2000 includes a stepped sub-area 3000 located at one side of the display area 1000, and the first substrate 100 includes a bonding section 101 located in the stepped sub-area 3000.

In this embodiment, the first substrate 100 is an array substrate, and the second substrate 200 is a color filter substrate, that is, the second substrate 200 is located on the light-exiting side of the display panel, and a base substrate of the first substrate 100 extends beyond a base substrate of the second substrate 200 to form the stepped sub-area 3000 in the non-display area 2000 on the first substrate 100.

It should be noted that the first substrate 100 may be one of an array substrate or a color filter substrate, and the second substrate 200 may be another one of the array substrate or the color filter substrate. In this embodiment, it is only exemplary that the first substrate 100 is an array substrate and the second substrate 200 is a color filter substrate.

In this embodiment, the first polarizer 410 includes an extension section extending into the stepped sub-area 3000, a black shielding layer 600 is provided on one side of the extension section, and an orthographic projection of the black shielding layer 600 on the first substrate 100 covers at least the bonding section 101.

Specifically, in one embodiment, the black shielding layer 600 is located on a side of the extension section of the first polarizer 410 close to the first substrate 100. It should be noted that a position of the black shielding layer 600 is not specifically limited. For example, the black shielding layer 600 can also be located on a side of the extension section away from the first substrate 100. It is appreciated that the black shielding layer 600 located on the side of the extension section of the polarizer 410 close to the first substrate 100 is only exemplary.

In this embodiment, the black shielding layer 600 includes but is not limited to black ink, wherein a material of the black ink includes a black pigment, a resin, a solvent and oil, a filler, and an auxiliary agent, and the black pigment is present in an amount of 20% to 40%, the resin is present in an amount of 15% to 25%, the solvent and oil are present in an amount of 25% to 40%, and the filler and auxiliary agent are present in an amount of 2% to 5%. It should be noted that the black shielding layer 600 may be prepared on a side of the second substrate 200 away from the first substrate 100 by low-temperature screen printing.

Further, in this embodiment, the display module further includes a filling layer 700 located between the black shielding layer 600 and the bonding section 101; wherein the orthographic projection of the black shielding layer 600 in a direction perpendicular to a plane where the display panel is located at least covers an orthographic projection of the filling layer 700 in the direction perpendicular to the plane where the display panel is located.

Specifically, a side of the filling layer 700 close to the second substrate 200 is flush with a side of the black shielding layer 600 close to the second substrate 200, and a side of the filling layer 700 away from the second substrate 200 is flush with a side of the black shielding layer 600 away from the second substrate 200.

It should be noted that a material of the filling layer 700 includes but is not limited to transparent optical glue, and in the stepped sub-area 3000 of the display panel, an edge of the first polarizer 410 not only extends beyond an edge of the second substrate 200, but also extends beyond an edge of the base substrate of the first substrate 100, and a length of the base substrate extends beyond the first substrate 100 by about 1 to 3 mm As such, it can be ensured that it is easier to prepare the filling layer 700 between the first polarizer 410 and the base substrate of the first substrate 100.

In this embodiment, the black shielding layer 600 is provided on one side of the extension section of the first polarizer 410, and the orthographic projection of the black shielding layer 600 on the first substrate 100 covers at least the bonding section 101, so that the bonding section 101 is prevented from being exposed and affecting the visual experience. Compared with the display device without bezel on three sides in the prior art, the present embodiments eliminate the bezel for protecting the bonding section 101, so that bezel-less on four sides can be realized. Meanwhile, in the filling layer 700 between the black shielding layer 600 and the bonding section 101 of the display panel, a side of the filling layer 700 close to the second substrate 200 is flush with a side of the black shielding layer 600 close to the second substrate 200, and a side of the filling layer 700 away from the second substrate 200 is flush with a side of the black shielding layer 600 away from the second substrate 200, so that the filling layer 700 supports the first polarizer 410 and prevents the first polarizer 410 from forming a recess in the stepped sub-area 3000, that is, the stepped sub-area 3000 is provided with the filling layer 700 to make the first polarizer 410 a flat surface, so as to ensure flatness of the display panel and ensure the design sense of the overall plane of the four-sided borderless display module.

In this embodiment, the display module further includes a black matrix 300 disposed between the first substrate 100 and the second substrate 200, and the black matrix 300 is located in the non-display area 2000. Specifically, in this embodiment, the black matrix 300 is located around the display panel, wherein the black matrix 300 includes a black shielding wall 310 close to the stepped sub-area 3000, the orthographic projection of the black shielding layer 600 on the first substrate 100 is adjacent to an orthographic projection of the black shielding wall 310 on the first substrate 100, and a distance between the orthographic projection of the black shielding layer 600 on the first substrate 100 and the orthographic projection of the black shielding wall 310 on the first substrate 100 is equal to zero.

In this embodiment, the black shielding layer 600 and the black shielding wall 310 collectively form a light-shielding structure. It is appreciated that by absorbing light leakage from the stepped sub-area 3000 of the display panel through the black shielding layer 600, this light-shielding structure is simple, and can be implemented by simple processes. After the first substrate 100 and the second substrate 200 are assembled together to form a cell, it is only necessary to form the black shielding layer 600 on the side of the extension section of the first polarizer 410, and then adhere the first polarizer 410 on the light emitting side of the display panel, which can reduce complexity of the manufacturing process and reduce costs. Of course, the filling layer 700 can be prepared before adhering the first polarizer 410 on the light-exiting side of the display panel, or after adhering the first polarizer 410 on the light-exiting side of the display panel, which is not specifically limited in this embodiment.

Figure 5:
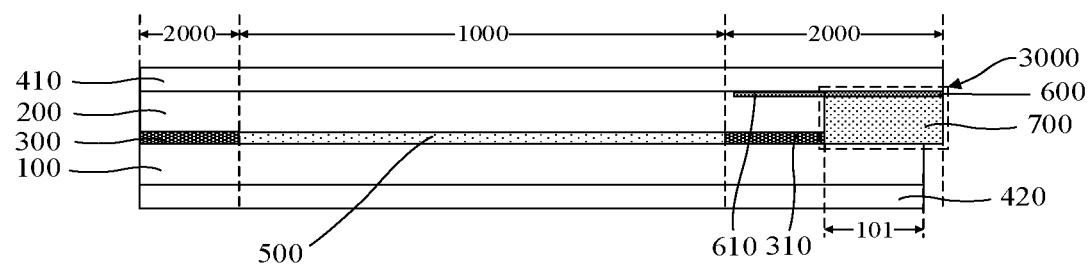
FIG. 5 is a schematic diagram of a second structure of the display module provided by an embodiment of the present application.

Please refer to FIG. 5, which is a schematic diagram of a second structure of the display module provided by an embodiment of the present application.

In this embodiment, the structure of the display panel is similar to or same as the first structure of the display panel provided in the above embodiment. Details can be referred to the description of the display panel in the above embodiment, which will not be repeated herein for brevity. The differences between the two are merely as follows.

In this embodiment, the black shielding layer 600 includes a black shielding sub-layer 610 extending to the display area 1000 and located above the black shielding wall 310, and an orthographic projection of the black shielding wall 310 on the second substrate 200 covers an orthographic projection of the black shielding sub-layer 610 on the second substrate 200.

In this embodiment, the black shielding sub-layer 610 covers at least a gap between the black shielding wall 310 and the filling layer 700, and the black shielding sub-layer 610 does not cover the display area 1000 of the display panel. It is appreciated that materials of the black shielding sub-layer 610 and the black shielding layer 600 may be the same, and the black shielding sub-layer and the black shielding layer 600 are both located on a same side of the first polarizer 410. Therefore, the black shielding sub-layer and the black shielding layer 600 can be prepared at the same time, thereby reducing the process of manufacturing the display panel.

In this embodiment, the black shielding sub-layer 610 extends to the display area 1000 and is located above the black shielding wall 600, and the black shielding sub-layer 610 covers at least the gap between the black shielding wall 310 and the filling layer 700, so that the gap between the black shielding wall 310 and the filling layer 700 can be prevented from causing light leakage, and the black shielding sub-layer 610 does not cover the display area 1000 of the display panel to avoid interference to the display area 1000 of the display panel.

Figure 6:
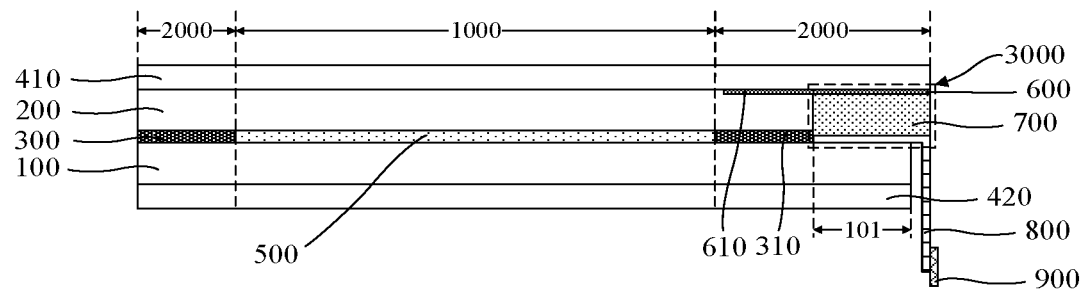
FIG. 6 is a schematic diagram of a third structure of the display module provided by an embodiment of the present application.

Please refer to FIG. 6, which is a schematic diagram of a third structure of the display module provided by an embodiment of the present application.

In this embodiment, the structure of the display panel is similar to or same as the second structure of the display panel provided in the above embodiment. Details can be referred to the description of the display panel in the above embodiment, which will not be repeated herein for brevity. The differences between the two are merely as follows.

In this embodiment, the display module further includes a chip-on-film 800 bound on the bonding section 101; wherein the orthographic projection of the black shielding layer 600 in a direction perpendicular to a plane where the display panel is located covers orthographic projections of the chip-on-film 800 and the bonding section 101 in the direction perpendicular to the plane where the display panel is located.

Specifically, the display module adopts a chip-on-film (COF) structure, and the display module further includes a chip-on-film (COF), the chip-on-film 800 is bound to the bonding section 101, and the chip-on-film 800 is provided with a driving circuit 900. The orthographic projection of the black shielding layer 600 in the direction perpendicular to a plane where the display panel is located covers orthographic projections of the chip-on-film 800, the bonding section 101, and the driving circuit 900 in the direction perpendicular to the plane where the display panel is located.

Please refer to FIG. 7, which is a flow chart showing a method of manufacturing the display module provided by an embodiment of the present application.

An embodiment of the present application also provides a method of manufacturing a display module, which includes the following steps:

Step S10: providing a display panel, wherein the display panel includes a first substrate 100 and a second substrate 200 disposed opposite to each other, and a liquid crystal layer 500 disposed between the first substrate 100 and the second substrate 200, the display module includes a display area 1000 and a non-display area 2000 adjacent to the display area 1000, the non-display area 2000 includes a stepped sub-area 3000 located at one side of the display area 1000, and the first substrate 100 includes a bonding section 101 located in the stepped sub-area 3000.

It should be noted that the first substrate 100 may be one of an array substrate or a color filter substrate, which is not specifically limited in this embodiment.

In this embodiment, the display panel further includes a black matrix 300 disposed between the first substrate 100 and the second substrate 200, and the black matrix 300 is located in the non-display area 2000, wherein the black matrix 300 includes a black shielding wall 310 close to the stepped sub-area 3000.

Step S20: providing a first polarizer 410, wherein the first polarizer 410 includes an extension section, and forming a black shielding layer 600 on one side of the extension section.

Referring to FIG. 8, the step S20 further includes the following steps:

Step S21: providing a polarizing film 400, which includes the first polarizer 410 and a release film 430 formed on the first polarizer 410, and the first polarizer 410 includes an extension section.

Specifically, the polarizing film 400 further includes a protective film 440 on a side of the first polarizing film 410 away from the release film 430.

Step S22: cutting the release film 430 to form a release sub-film 431 corresponding to the extension section.

Step S23: removing the release sub-film 431, and forming the black shielding layer 600 on the extension section.

Specifically, the step S23 includes, but is not limited to, using a winding device to remove the release sub-film 431, while simultaneously forming the black shielding layer 600 on the extension section, or using a cutting machine to completely remove the release sub-film 431, and then forming the black shielding layer 600 on the extension section. It is appreciated that no particular limitation is imposed on this embodiment.

Step S30: adhering the first polarizer 410 to a light-exiting side of the display panel, wherein the first polarizer 410 is disposed on a side of the second substrate 200 away from the first substrate 100, and an orthographic projection of the black shielding layer 600 on the first substrate 100 covers at least the bonding section 101.

Specifically, in this embodiment, the orthographic projection of the black shielding layer 600 on the first substrate 100 is adjacent to an orthographic projection of the black shielding wall 310 on the first substrate 100, and a distance between the orthographic projection of the black shielding layer 600 on the first substrate 100 and the orthographic projection of the black shielding wall 310 on the first substrate 100 is equal to zero.

In this embodiment, the black shielding layer 600 and the black shielding wall 310 jointly form a light-shielding structure. It is appreciated that this light-shielding structure absorbs light leakage from the stepped sub-area 3000 of the display panel through the black shielding layer 600, has a simple structure, and can be implemented by simple processes. After the first substrate 100 and the second substrate 200 are assembled together to form a cell, it is only necessary to form the black shielding layer 600 on the side of the extension section of the first polarizer 410, and then adhere the first polarizer 410 on the light emitting side of the display panel, which can reduce complexity of the manufacturing process and reduce costs.

Further, in this embodiment, the method of manufacturing the display module further includes the following steps:

Step S40: providing a second polarizer 420.

Step S50: adhering the second polarizer 420 on a side of the display panel away from the light-exiting side, the second polarizer 420 is disposed on the side of the first substrate 100 away from the second substrate 200, and a projection of the second polarizer 420 on the first substrate 100 falls within an area occupied by the first substrate 100.

Step S60: forming a filling layer 700 between the black shielding layer 600 and the bonding section 101; wherein the orthographic projection of the black shielding layer 600 in a direction perpendicular to a plane where the display panel is located at least covers an orthographic projection of the filling layer 700 in the direction perpendicular to the plane where the display panel is located.

Specifically, a side of the filling layer 700 close to the second substrate 200 is flush with a side of the black shielding layer 600 close to the second substrate 200, and a side of the filling layer 700 away from the second substrate 200 is flush with a side of the black shielding layer 600 away from the second substrate 200, so that the filling layer 700 supports the first polarizer 410 and prevents the first polarizer 410 from forming a recess in the stepped sub-area 3000, that is, the stepped sub-area 3000 is provided with the filling layer 700 to make the first polarizer 410 a flat surface, so as to ensure flatness of the display panel and ensure the design sense of the overall plane of the four-sided borderless display module.

It should be noted that a material of the filling layer 700 includes but is not limited to optical glue, and in the stepped sub-area 3000 of the display panel, an edge of the first polarizer 410 not only extends beyond an edge of the second substrate 200, but also extends beyond an edge of the base substrate of the first substrate 100, and a length of the base substrate extends beyond the first substrate 100 by about 1 to 3 mm. As such, it can be ensured that it is easier to prepare the filling layer 700 between the first polarizer 410 and the base substrate of the first substrate 100.

It is appreciated that the filling layer 700 may also be prepared before the step S30, that is, before the first polarizer 410 is adhered on the light-exiting side of the display panel, in the stepped sub-area 3000, the filling layer 700 is formed on the bonding section 101 of the first substrate 100 located in the stepped sub-area 3000, and a side of the filling layer 700 close to the second substrate 200 is flush with an edge of the second substrate 200.

Step S70: bonding the chip-on-film 800 on the bonding section 101; wherein the orthographic projection of the black shielding layer 600 in the direction perpendicular to the plane where the display panel is located covers orthographic projections of the chip-on-film 800 and the bonding section 101 in the direction perpendicular to the plane where the display panel is located.

This embodiment also provides a display device, which includes any of the display modules described in the foregoing embodiments.

The display module has been described in detail in the above embodiments, and is not repeated herein.

In specific applications, the display device may be a display screen of a smart phone, a tablet computer, a notebook a computer, a smart bracelet, a smart watch, a smart glasses, a smart helmet, a desktop computer, a smart TV, or a digital camera, and can even be applied to electronic devices with flexible display screens.

In summary, a display module, a manufacturing method thereof, and a display device are provided. The display module includes a display panel and a polarizer arranged on a light-exiting side of the display panel, the display panel includes a first substrate and a second substrate arranged opposite to each other, and a liquid crystal layer disposed between the first substrate and the second substrate, and the polarizer is disposed on a side of the second substrate away from the first substrate; wherein the display module further includes a display area and a non-display area adjacent to the display area, and the non-display area includes a stepped sub-area located at one side of the display area; and wherein the first substrate includes a bonding section located in the stepped sub-area, the polarizer includes an extension section extending into the stepped sub-area, a black shielding layer is disposed on one side of the extension section, and an orthographic projection of the black shielding layer on the first substrate at least covers the bonding section. As such, there is no need to worry about exposure of the bonding section which impacts vision experience, and a bezel for protecting the bonding section is omitted, so that bezellessness can be truly realized.

In the above embodiments, the descriptions of each embodiment have their own emphasis. The parts that are not described in detail in an embodiment can be referred to the detailed descriptions in other embodiments above.

It can be understood that for those of ordinary skill in the art, equivalent substitutions or changes can be made according to the technical solutions and inventive concepts of the present application, and all these changes or substitutions shall fall within the protection scope of the appended claims of the present application.

What is claimed is:

1. A display module, wherein the display module comprises a display panel and a polarizer arranged on a light-exiting side of the display panel, the display panel comprises a first substrate and a second substrate arranged opposite to each other, and a liquid crystal layer disposed between the first substrate and the second substrate, and the polarizer is disposed on a side of the second substrate away from the first substrate;

wherein the display module further comprises:
a display area and a non-display area adjacent to the display area, and the non- display area comprises a stepped sub-area located at one side of the display area;
a black matrix disposed between the first substrate and the second substrate, and the black matrix is located in the non-display area; and
a chip-on-film bound on the bonding section;
wherein the first substrate comprises a bonding section located in the stepped sub-area, the polarizer comprises an extension section extending into the stepped sub-area, a black shielding layer is disposed on one side of the extension section, and an orthographic projection of the black shielding layer on the first substrate at least covers the bonding section; and
wherein an orthographic projection of the black shielding layer in a direction perpendicular to a plane where the display panel is located covers orthographic projections of the chip-on-film and the bonding section in the direction perpendicular to the plane where the display panel is located.

2. The display module according to claim 1, wherein the black shielding layer is located on a side of the extension section of the polarizer close to the first substrate.

3. The display module according to claim 2, wherein the display module further comprises a filling layer located between the black shielding layer and the bonding section; and
wherein an orthographic projection of the black shielding layer in a direction perpendicular to a plane where the display panel is located at least covers an orthographic projection of the filling layer in the direction perpendicular to the plane where the display panel is located.

4. The display module according to claim 3, wherein a side of the filling layer close to the second substrate is flush with a side of the black shielding layer close to the second substrate, and a side of the filling layer away from the second substrate is flush with a side of the black shielding layer away from the second substrate.

5. The display module according to claim 1, wherein the black matrix comprises a black shielding wall close to the stepped sub-area; and
wherein the orthographic projection of the black shielding layer on the first substrate is adjacent to an orthographic projection of the black shielding wall on the first substrate, and a distance between the orthographic projection of the black shielding layer on the first substrate and the orthographic projection of the black shielding wall on the first substrate is equal to zero.

6. The display module according to claim 5, wherein the black shielding layer comprises a black shielding sub-layer extending to the display area and located above the black shielding wall, and an orthographic projection of the black shielding wall on the second substrate covers an orthographic projection of the black shielding sub-layer on the second substrate.

7. The display module according to claim 1, wherein the display module further comprises a driving circuit disposed on the chip-on-film, and the orthographic projection of the black shielding layer in the direction perpendicular to the plane where the display panel is located covers an orthographic projection of the driving circuit in the direction perpendicular to the plane where the display panel is located.

8. The display module according to claim 1, wherein the black shielding layer is located on a side of the extension section away from the first substrate.

9. A method of manufacturing a display module, which comprises the following steps:
providing a display panel, wherein the display panel comprises a first substrate and a second substrate disposed opposite to each other, and a liquid crystal layer disposed between the first substrate and the second substrate, the display module comprises:
a display area and a non-display area adjacent to the display area, the non-display area comprises a stepped sub-area located at one side of the display area, and the first substrate comprises a bonding section located in the stepped sub-area;
a black matrix disposed between the first substrate and the second substrate, and the black matrix is located in the non-display area; and
a chip-on-film bound on the bonding section;
providing a polarizer, wherein the polarizer comprises an extension section, and forming a black shielding layer on one side of the extension section; and
adhering the polarizer to a light-exiting side of the display panel, wherein the polarizer is disposed on a side of the second substrate away from the first substrate, and an orthographic projection of the black shielding layer on the first substrate covers at least the bonding section;
wherein an orthographic projection of the black shielding layer in a direction perpendicular to a plane where the display panel is located covers orthographic projections of the chip-on-film and the bonding section in the direction perpendicular to the plane where the display panel is located.

10. The method of manufacturing the display module according to claim 9, wherein the step of providing the polarizer, wherein the polarizer comprises the extension section, and forming the black shielding layer on the side of the extension section comprises:
providing a polarizing film, wherein the polarizing film comprises the polarizer and a release film formed on the polarizer, and the polarizer comprises the extension section;
cutting the release film to form a release sub-film corresponding to the extension section; and
removing the release sub-film, and forming the black shielding layer on the extension section.

11. A display device, comprising a display module, wherein the display module comprises a display panel and a polarizer arranged on a light-exiting side of the display panel, the display panel comprises a first substrate and a second substrate arranged opposite to each other, and a liquid crystal layer disposed between the first substrate and the second substrate, and the polarizer is disposed on a side of the second substrate away from the first substrate;
wherein the display module further comprises:
a display area and a non-display area adjacent to the display area, and the non-display area comprises a stepped subarea located at one side of the display area;
a black matrix disposed between the first substrate and the second substrate, and the black matrix is located in the non-display area; and
a chip-on-film bound on the bonding section;
wherein the first substrate comprises a bonding section located in the stepped sub-area, the polarizer comprises an extension section extending into the stepped sub-area, a black shielding layer is disposed on one side of the extension section, and an orthographic projection of the black shielding layer on the first substrate at least covers the bonding section; and
wherein an orthographic projection of the black shielding layer in a direction perpendicular to a plane where the display panel is located covers orthographic projections of the chip-on-film and the bonding section in the direction perpendicular to the plane where the display panel is located.

12. The display device according to claim 11, wherein the black shielding layer is located on a side of the extension section of the polarizer close to the first substrate.

13. The display device according to claim 12, wherein the display module further comprises a filling layer located between the black shielding layer and the bonding section; and
wherein an orthographic projection of the black shielding layer in a direction perpendicular to a plane where the display panel is located at least covers an orthographic projection of the filling layer in the direction perpendicular to the plane where the display panel is located.

14. The display device according to claim 13, wherein a side of the filling layer close to the second substrate is flush with a side of the black shielding layer close to the second substrate, and a side of the filling layer away from the second substrate is flush with a side of the black shielding layer away from the second substrate.

15. The display device according to claim 11, wherein the black matrix comprises a black shielding wall close to the stepped sub-area; and
wherein the orthographic projection of the black shielding layer on the first substrate is adjacent to an orthographic projection of the black shielding wall on the first substrate, and a distance between the orthographic projection of the black shielding layer on the first substrate and the orthographic projection of the black shielding wall on the first substrate is equal to zero.

16. The display device according to claim 15, wherein the black shielding layer comprises a black shielding sub-layer extending to the display area and located above the black shielding wall, and an orthographic projection of the black shielding wall on the second substrate covers an orthographic projection of the black shielding sub-layer on the second substrate.

17. The display device according to claim 11, wherein the display module further comprises a driving circuit disposed on the chip-on-film, and the orthographic projection of the black shielding layer in the direction perpendicular to the plane where the display panel is located covers an orthographic projection of the driving circuit in the direction perpendicular to the plane where the display panel is located.

18. The display device according to claim 11, wherein the black shielding layer is located on a side of the extension section away from the first substrate.

\* \* \* \* \*